Jan. 24, 1967  J. HARRIS  3,299,457
DOCKBOARD LOCKING UNIT
Filed Dec. 11, 1964  2 Sheets-Sheet 1
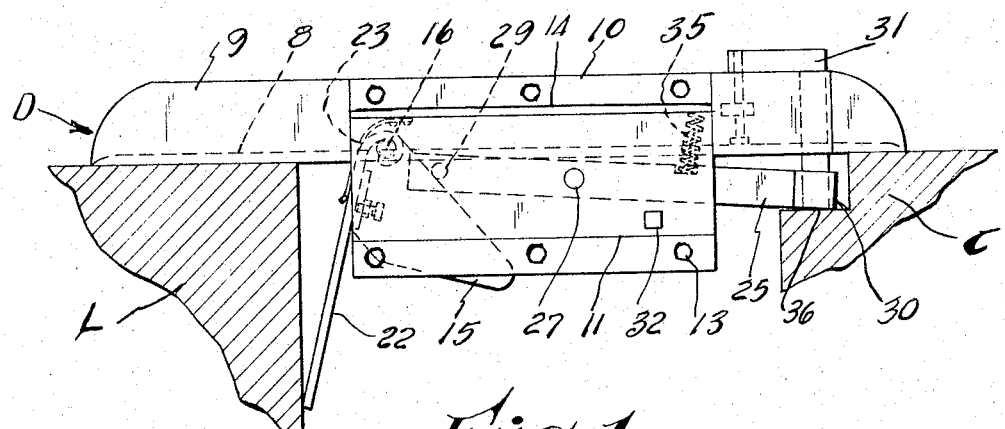
Fig. 1
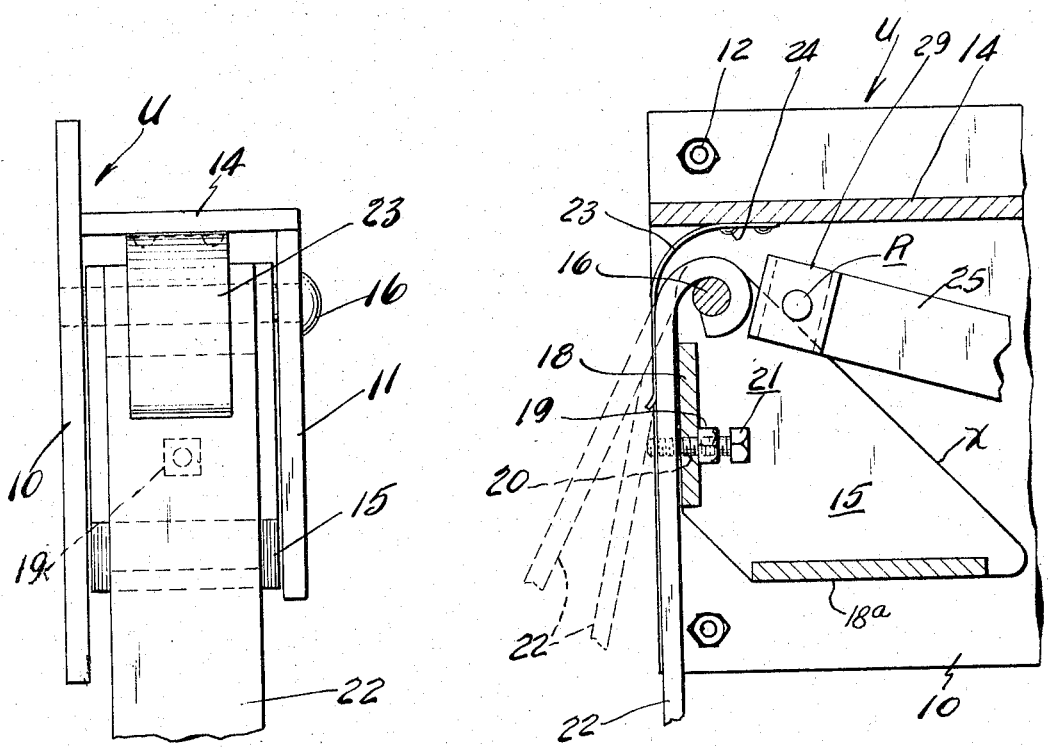
Fig. 4
Fig. 5
INVENTOR.
John Harris.
BY Pearman Pearman & McCulloch
ATTORNEYS

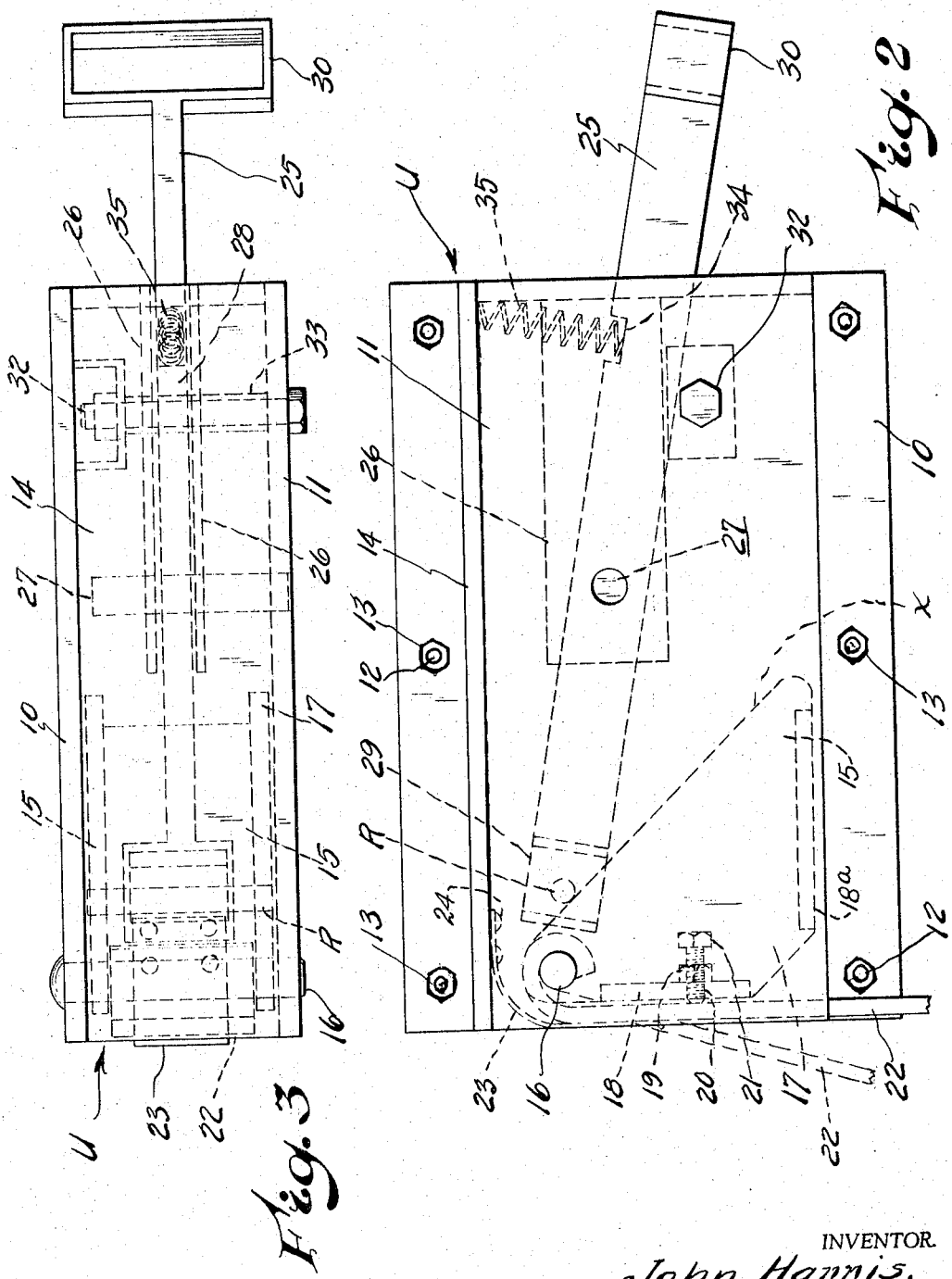

United States Patent Office 3,299,457
Patented Jan. 24, 1967

3,299,457
DOCKBOARD LOCKING UNIT
John Harris, 1108 9th St., Bay City, Mich. 48706
Filed Dec. 11, 1964, Ser. No. 417,609
7 Claims. (Cl. 14—72)

This invention relates to dockboards for bridging the space between a loading dock and a carrier of any nature, and more particularly to an adjustable locking mechanism mounted on a dockboard and by means of which the unit is automatically locked in position to provide a bridge between said dock and the carrier.

One of the prime objects of the invention is to provide a locking unit mounted on the dockboard and activated by the weight and shifting of the carrier as the load is removed to lock the dockboard in position between the loading dock and the carrier.

Another object is to provide a locking unit mounted on a dockboard, including means for maintaining pressure on the blade of the unit, still allowing limited movement of the entire dockboard unit as the carrier tilts inward toward the dock due to weight of the heavy industrial trucks, etc. used in conveying loads over the dockboard, and the shifting of the carrier as the load is being removed.

A further object of the invention is to provide a locking unit which requires no setting or adjustment other than the weight of the dockboard and locking units which provide the required pressure for operation.

A still further object is to provide an automatic locking unit which is readily attachable to and detachable from a conventional dockboard; which requires no adjustment whatsoever, and which is fully automatic in operation.

A further object still is to provide locking units for mounting on a dockboard which units prevent accidental release and falling of the dockboard due to shifting of the carrier as the load is removed or for any other reason, thus minimizing the possibility of accidental injury to workmen, and the expense due to broken or damaged dockboards.

With the above and other objects in view, the present invention consists in the combination and arrangement of parts hereinafter more fully described, illustrated in the accompanying drawings, and more particularly pointed out in the appended claims; it being understood that changes may be made in the form, size, proportion and minor details of construction, without departing from the spirit, or sacrificing any of the advantages of the invention.

In the drawings:

FIG. 1 is a side elevational view showing a dockboard in position between a dock and a carrier with the locking unit in position thereon.

FIG. 2 is an enlarged, side elevational view of the locking unit, the broken lines showing the blade in extended position and the lever arm raised.

FIG. 3 is a top plan view thereof.

FIG. 4 is an enlarged fragmentary, front elevational view showing the blade mounting, etc.

FIG. 5 is an enlarged, fragmentary, sectional side elevational view of the locking unit, the broken lines showing the blade adjustment.

Referring now more specifically to the drawings in which I have shown the preferred embodiment of my invention.

The letter D indicates a conventional dockboard which comprises a flat floor section 8 having side walls 9, with the dockboard, open at both ends, to accommodate trucks and the like, (not shown), for travel thereover, the dockboard spanning the space between a loading dock L and a carrier C, all as clearly shown in FIG. 1 of the drawings.

The locking unit U is generally secured to the side wall 9 of the dockboard and comprises a pair of spaced apart side plates 10 and 11, respectively, the plate 10 being of greater depth than the plate 11, and is provided with a plurality of spaced apart openings 12 to accommodate bolts 13 for securing the locking unit to the side wall 9 of the dockboard. A plate 14 is welded to the upper edge of the side plate 11, and to the plate 10 at a point adjacent the upper end thereof and forms a cover for the unit, said locking unit being open at the ends and bottom to form an open housing to facilitate assembly of the parts and the easy handling of the unit.

A triangular shaped bracket 15 is mounted on a transversely disposed pin 16 which spans the walls 17 of said housing, said bracket comprising a pair of spaced apart legs 17 formed with a front wall section 18, and a bottom connecting wall section 18a. A threaded nut 19 is welded to the front wall 18 in alignment with an opening 20 provided in said front wall, and an adjusting screw 21 is adjustably threaded in said nut, and for purposes to be presently described.

A flat depending blade 22, preferably formed of spring steel, is hingedly mounted on the pin 16 between the legs of the bracket, and a substantially L shaped flat spring 23 is secured to the inner face of top plate 14 by means of rivets 24 or the like, said spring leading downwardly with the free end bearing against the outer face of the blade 22 and tending to yieldingly force the blade back against the front wall 18 of the bracket at all times, and this blade can, of course, be adjusted outwardly with relation to the bracket by manipulation of the screw 21, this adjustment providing increased tension for larger spans.

The inner edges X of the bracket legs 17 are angularly disposed and are engageable by a transversely disposed roller pin "R" mounted on the one end of a lever arm 25 for regulating the outward swing movement of the bracket and blade as the carrier load is progressively removed.

The lever arm 25 is rockably mounted in the housing between the bar members 26 by means of pin 27, said bars extending to the rear end of the housing to form a longitudinal passage 28 to accommodate said arm, the front end of the arm terminating in an enlarged head section 29 which projects into the bracket mounting between the legs 17, and the transversely disposed roller pin R is mounted in said head section 29 for rolling engagement with the angled edges X of the legs 17 for swinging the blade outwardly as the free end of the lever 25 raises due to progressive removal of the load of the carrier.

The free end of the lever arm 25 terminates in an outer hollow handle section 30 which bears on the car door rail C, or the platform of any carrier (not shown), and vertically disposed bars 31 are mounted in the handle sections 30 for stabilizing the arms. A transversely disposed bolt 32 forms a stop for the downward swing of the arm 25 and is mounted in a sleeve 33, as shown. A spring pocket 34 is provided in the upper edge of the lever 25 and a spring 35 is interposed between the pocket 35 and the cover of the housing and tends to force the lever downwardly at all times.

In practice, the lock is first secured to the side walls of the dockboard by means of bolts 13 or the like, and the dockboard is then placed in position to span the distance between a dock and carrier with one end of the dockboard bearing on the dock L and the opposite end on a carrier C; the free end 30 of lever 25 bearing on the shouldered section 36 of the carrier, and as the load on the carrier is progressively removed, said carrier raises accordingly, this also raises the free end of arm 25 pivoting it about the pin 27, the roller pin R riding on the edge X of the angularly disposed legs 17 causing the bracket 15 to swing outwardly on the pin 16 (see FIGS. 2 and 5 of the drawings), and move the free end section of the resilient blade into contact with the front wall of the dock and thus prevent slippage or complete displacement of the dockboard, the spring 27 is provided to keep the blade 22 in retracted position when no pressure is exerted by the lever arm.

From the foregoing description, it will be obvious that I have perfected a very simple, practical and relatively inexpensive locking unit which can be readily manufactured and assembled, applied and/or removed, and which requires no other than altering the swing of the depending blade to suit different spans of greater or less width.

I claim:

1. The combination with a dockboard adapted to span the space between a loading dock and a carrier, of locking units secured thereto and comprising: a housing mounted on the wall of the dockboard; an angularly disposed bracket pivotally mounted therein; a depending blade swingingly mounted on said bracket mounting; a lever arm rockably mounted in said housing at a point intermediate its length with its one free end to be mounted on the carrier; said lever arm being provided with means on its opposite end for rolling engagement with said angularly disposed bracket to swing said blade into yielding engagement with the loading dock as the load is progressively removed from the carrier.

2. The combination defined in claim 1 in which means is provided on said bracket for adjusting the position of said blade with relation to said bracket.

3. The combination set forth in claim 1 in which resilient means is provided for swinging said blade back to its normal retracted position when pressure on the arm ceases.

4. The combination defined in claim 1 in which stop means is provided in said housing for limiting the downward travel of the free end of said lever arm.

5. The combination with a dockboard adapted to span the space between a loading dock and a carrier; of an open ended housing releasably secured to the side wall of said dockboard; a bracket pivotally mounted in the front end of the housing and provided with angularly disposed legs; a depending blade hingedly secured to said bracket mounting; a lever arm rockably mounted in said housing at a point intermediate its length and roller means on its one end for rolling engagement with the angularly disposed legs, and means on said bracket for adjusting the position of said blade with relation to the bracket.

6. The combination with a dockboard adapted to span the space between a loading dock and a carrier having a locking unit mounted thereon and comprising: a housing releasably secured to the side wall of the dockboard; a blade assembly hingedly mounted therein; a bracket in said housing; a lever arm pivotally mounted in the housing at a point intermediate its length with its one end projecting beyond said housing for support on a load carrier; and said bracket blade being progressively forced outwardly by said arm for engagement with a loading dock as the load is progressively removed from said carrier.

7. The combination with a dockboard adapted to span the space between a loading dock and a carrier, of a locking unit mounted thereon and comprising: a housing adapted to be secured to each side wall of the dockboard; a lever arm rockably mounted in said housing at a point intermediate its length with its one end projecting beyond the one end of said housing for bearing on the carrier; a bracket hingedly mounted in the opposite end of said housing and formed with angularly disposed legs; a blade assembly hingedly mounted on the bracket mounting and normally in engagement with said bracket, said bracket and blade being progressively forced outwardly by said lever arm to swing said blade into yielding engagement with the loading dock as the load is progressively removed from the carrier.

References Cited by the Examiner

UNITED STATES PATENTS

| | | | |
|---|---|---|---|
| 2,337,138 | 12/1943 | Van Berg | 14—72 |
| 2,521,349 | 9/1950 | Diamond | 14—72 |
| 2,842,787 | 7/1958 | Murray | 14—72 |

JACOB L. NACKENOFF, *Primary Examiner.*